US007599921B2

(12) United States Patent
Biesenbach et al.

(10) Patent No.: US 7,599,921 B2
(45) Date of Patent: Oct. 6, 2009

(54) SYSTEM AND METHOD FOR IMPROVED NAME MATCHING USING REGULARIZED NAME FORMS

(75) Inventors: David Edward Biesenbach, Alexandria, VA (US); Richard Theodore Gillam, Chantilly, VA (US); Frankie Elizabeth Patman Maguire, Washington, DC (US); Leonard Arthur Shaefer, Jr., Leesburg, VA (US); Charles Kinston Williams, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 11/681,333

(22) Filed: Mar. 2, 2007

(65) Prior Publication Data

US 2008/0215562 A1 Sep. 4, 2008

(51) Int. Cl.
*G06F 17/30* (2006.01)
(52) U.S. Cl. .................................. 707/3; 704/7; 704/8
(58) Field of Classification Search .................. 707/1, 707/3, 6; 704/4, 5, 7, 8, 9, 243, 252; 715/741
See application file for complete search history.

(56) References Cited

U.S. PATENT DOCUMENTS

| 5,912,949 A | 6/1999 | Chan et al. ............... 379/88.03 |
| 6,963,871 B1 * | 11/2005 | Hermansen et al. ............ 707/6 |
| 2005/0119875 A1 | 6/2005 | Shaefer, Jr. et al. ............ 704/7 |
| 2006/0031239 A1 | 2/2006 | Koenig ...................... 707/100 |
| 2008/0215621 A1 * | 9/2008 | Ravindran et al. ....... 707/104.1 |

OTHER PUBLICATIONS

Hermansen, "Automatic Name Searching in Large Data Bases of International Names," abstract of doctoral dissertation, Georgetown University, Department of Linguistics, 1985.
Patman et al., "Names: A New Frontier in Text Mining," Symposium on Intelligence and Security Informatics, No. 1, Tucson, AZ, ETATS-UNIS Jun. 2003, 20031973, vol. 2665, pp. 27-38.
Zawaydeh et al., "Orthographic Variations in Arabic Corpora," Basis Technology Corporation, 2006, http://www.basistech.com/knowledge-center/Arabic/orthographic-variations-in-arrabic.pdf.

* cited by examiner

*Primary Examiner*—Fred I Ehichioya
(74) *Attorney, Agent, or Firm*—VanLeeuwen & VanLeeuwen; Erin C. Ming

(57) ABSTRACT

A system and method for improved name matching using regularized name forms is presented. A regularization rule engine uses culture-specific regularization rules to iteratively convert candidate names and query names to a canonical form, which are regularized candidate names and regularized query names, respectively. The regularization rules are context-sensitive or context-free rules that pertain to a name's originating culture. Subsequently, a name search engine compares the regularized query name with the regularized candidate names and identifies the regularized candidate names that meet a particular regularization matching threshold. In turn, name search engine selects the candidate names that correspond to the identified regularized candidate names and provides the selected candidate names to a user.

17 Claims, 8 Drawing Sheets

SYSTEM AND METHOD FOR IMPROVED NAME MATCHING USING REGULARIZED NAME FORMS

BACKGROUND OF THE INVENTION

1. Technical Field

The present invention relates to a system and method for improved name matching using regularized name forms. More particularly, the present invention relates to a system and method for regularizing candidate names and query names based upon their particular culture origin, and identifying names whose corresponding regularized candidate names meet a matching threshold when compared against a regularized query name.

2. Description of the Related Art

A major difficulty in successfully matching personal names stored in a database with a user-provided name query arises when variant forms of the name are possible either through 1) spelling variation inherent to the language itself, or 2) through spelling variation that arises when the names are transliterated into the Roman alphabet from other writing systems.

One approach relies on phonetically based rewrite rules that convert a name to a phonetic form approximating its pronunciation, along with the calculation of a phonetic distance value between two name forms that are being compared. A challenge found, however, is that this approach is only valid in cases in which alternate spelling variations for names that sound similar are inherent to the language itself. Name variants that arise from different transliteration conventions may not show evidence of such similarity in pronunciation. Furthermore, generating phonetic variants and calculating their similarity is computationally very expensive, making it necessary to create a static, pre-processed database that may not be changed or updated in real time. When a new record is added or a rule is changed, the entire database must be regenerated, which renders such a system impractical for most users.

What is needed, therefore, is a system and method that effectively and efficiently improve name-matching capabilities for names with spelling variations and transliteration variations.

SUMMARY

It has been discovered that the aforementioned challenges are resolved using a system, method, and program product that retrieves a candidate name. The system, method, and program product then identify a cultural classification that corresponds to the candidate name. The system, method, and program product then retrieve one or more culture-specific regularization rules corresponding to the cultural classification. The system, method, and program product then apply one or more of the culture-specific regularization rules to the candidate name, which results in a regularized candidate name. The system, method, and program product then store the regularized candidate name in a storage area.

In one embodiment, the system, method, and program product receive a query name from a user. In this embodiment, the system, method, and program product detect that the cultural classification corresponds to the query name. The system, method, and program product then apply one or more of the regularization rules to the query name, which results in a regularized query name. The system, method, and program product then store the regularized query name in a storage area.

In one embodiment, the system, method, and program product compare the regularized candidate name with the regularized query name. In this embodiment, the system, method, and program product determine that the comparison meets a regularization matching threshold. The system, method, and program product then determine that the candidate name corresponds to the regularized candidate name. The system, method, and program product then provide the candidate name to the user.

In one embodiment, the system, method, and program product's culture-specific regularization rules are context-sensitive rules or context-free rules, which convert one or more letters included in the candidate name to one or more different letters.

In one embodiment, the system, method, and program product's cultural classification corresponds to an originating culture of the candidate name. In another embodiment, the system, method, and program product apply the culture-specific regularization rules such that the application does not result in the regularized candidate name corresponding to a different originating culture than the candidate name.

In one embodiment, the system, method, and program product determine that a first regularization rule included in the culture-specific regularization rules applies to the candidate name. In this embodiment, the system, method, and program product generate a first iteration regularized candidate name by applying the first regularized rule to the candidate name. The system, method, and program product then determine that a second regularization rule included in the culture-specific regularization rules applies to the candidate name. The system, method, and program product then generate the regularized candidate name by applying the second regularized rule to the first iteration regularized candidate name.

In one embodiment, the system, method, and program product's cultural classification corresponds to an originating culture that is selected from the group consisting of Afghan, Anglo, Arabic, Chinese, Farsi, French, German, Hispanic, Indian, Indonesian, Japanese, Korean, Pakistani, Russian, Thai, Vietnamese, and Yoruban.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
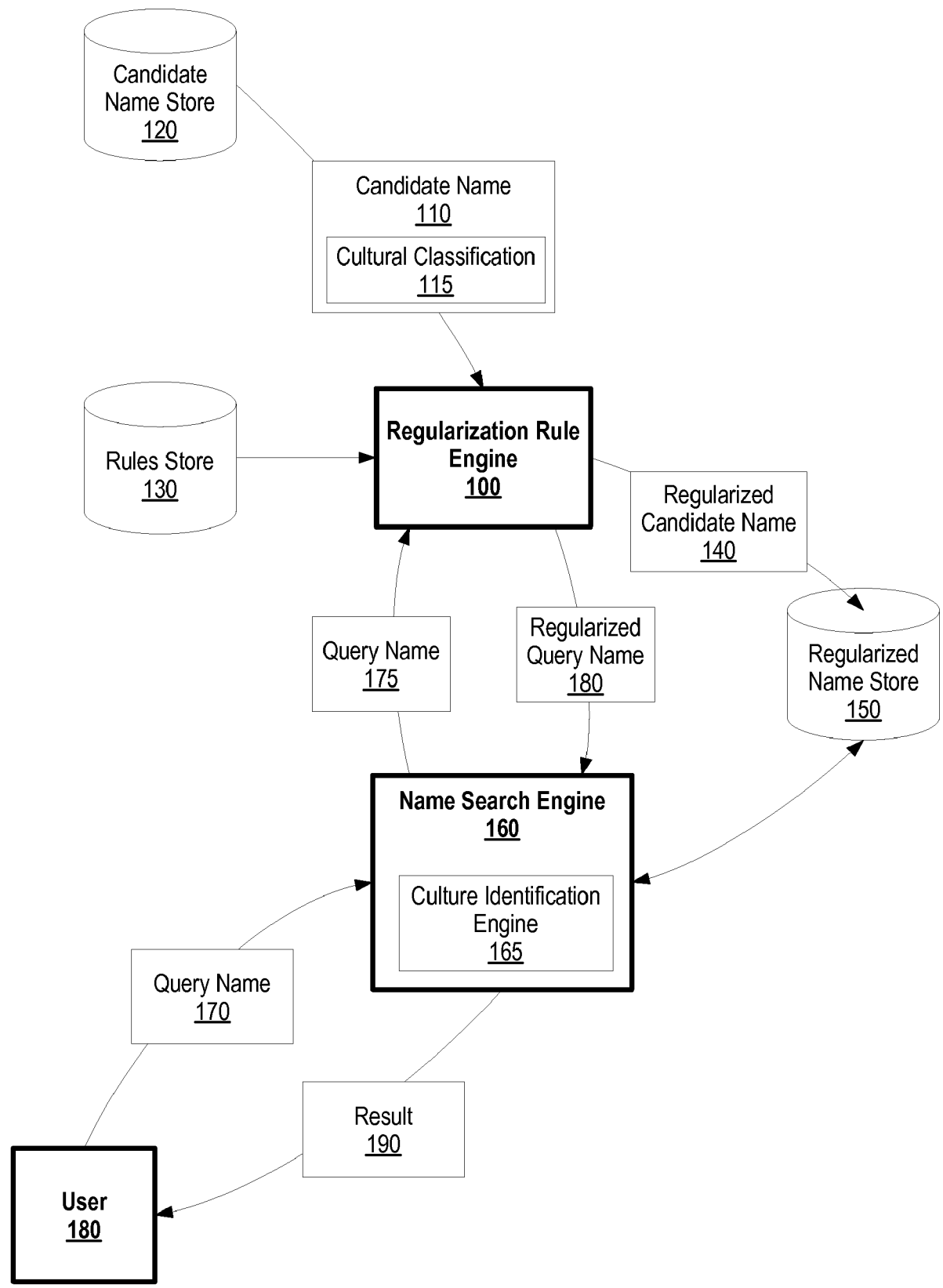
FIG. 1 is a diagram showing a regularization engine regularizing candidate names and a query name, and a name search engine matching the regularized candidate names with the regularized query name.

FIG. 1 is a diagram showing a regularization engine regularizing candidate names and a query name, and a name search engine matching the regularized candidate names with the regularized query name. Regularization rule engine 100 uses culture-specific regularization rules included in rules store 130 to regularize candidate names and query names into canonical form. Subsequently, name search engine 160 compares the regularized query name with the regularized candidate names and identifies the regularized candidate names that meet a particular regularization matching threshold. In turn, name search engine selects the candidate names that correspond to the identified regularized candidate names and provides the selected candidate names to user 180. Rules store 130 may be stored on a nonvolatile storage area, such as a computer hard drive.

Regularization rule engine 100 retrieves candidate name 110 from candidate name store 120. Candidate name 110 includes cultural classification 115, which identifies candidate name 110's culture origin, such as Afghan, Anglo, Arabic, Chinese, Farsi, French, German, Hispanic, Indian, Indonesian, Japanese, Korean, Pakistani, Russian, Thai, Vietnamese, or Yoruban.

Regularization rule engine 100 uses cultural classification 115 to retrieve culture-specific regularization rules from rules store 130, such as a set of English regularization rules or a set of Arabic regularization rules. The regularization rules are used to convert candidate name 110 into a canonical form by converting letters based upon particular context-free or context-sensitive rules. For example, a context-free regularization rule "x>cks" converts any "x" into "cks," regardless of the letters that occur before or after the letter "x." In another example, a context-sensitive regularization rule "$break c} $vowel>k" converts a "c" at the beginning of a word and followed by a vowel into a "k," such as "co" (see FIG. 2 and corresponding text for further details).

Regularization rule engine 100 iteratively converts candidate name 110 into regularized candidate name 140 based upon each applicable regularization rule. Once regularization rule engine 100 is finished with the iterative conversion process, regularization rule engine 100 stores regularized candidate name 140 in regularized name store 150. Regularized name store 150 may be stored on a nonvolatile storage area, such as a computer hard drive. Regularization rule engine 100 performs the above process for each candidate name included in candidate name store 120, which results in multiple regularized candidate names, which are each stored in regularized name store 150.

Name search engine 160 receives query name 170 from user 180, which includes a name that user 180 wishes to query. Name search engine 160 uses cultural identification engine 165 to identify a cultural classification that corresponds to query name 170. As those skilled in the art can appreciate, cultural identification engine 165 may a standard off-the-shelf name classification system that uses statistical algorithms to identify a name's cultural origin.

Name search engine 160 sends query name 175, which includes query name 170 and its corresponding cultural classification, to regularization rule engine 100. In turn, regularization rule engine 100 retrieves culture-specific regularization rules from rules store 130 that correspond to the cultural classification included in query name 175. As such, regularization rule engine 100 iteratively converts query name 175 to regularized query name 180, which it sends back to name search engine 160.

Once name search engine 160 receives regularized query name 160, name search engine 160 compares regularized query name 180 with the regularized candidate names included in regularized name store 150. Name search engine 160 identifies regularized candidate names that meet a regularization matching threshold when compared with regularized query name. For example, name search engine 160 may base a potential match on bigram comparisons (i.e., overlap between combinations of two-character strings in the names). In this example, name search engine 160's matching threshold may be user-configurable and set at a 70% value. In turn, name search engine 160 identifies candidate names that correspond to matching regularized candidate names, and sends the identified candidate names as result 190 to user 180 (see FIG. 6 and corresponding text for further details).

In one embodiment, name search engine 160 performs a second comparison between original names in order to calculate an "unregularized" match score. Name search engine 160 performs the second comparison to account for situations in which the regularization rules are not applied to the original names because of, for example, typographical errors in the names. In this embodiment, name search engine 160 may identify names meeting a matching threshold from either the regularized or unregularized comparisons.

Figure 2:
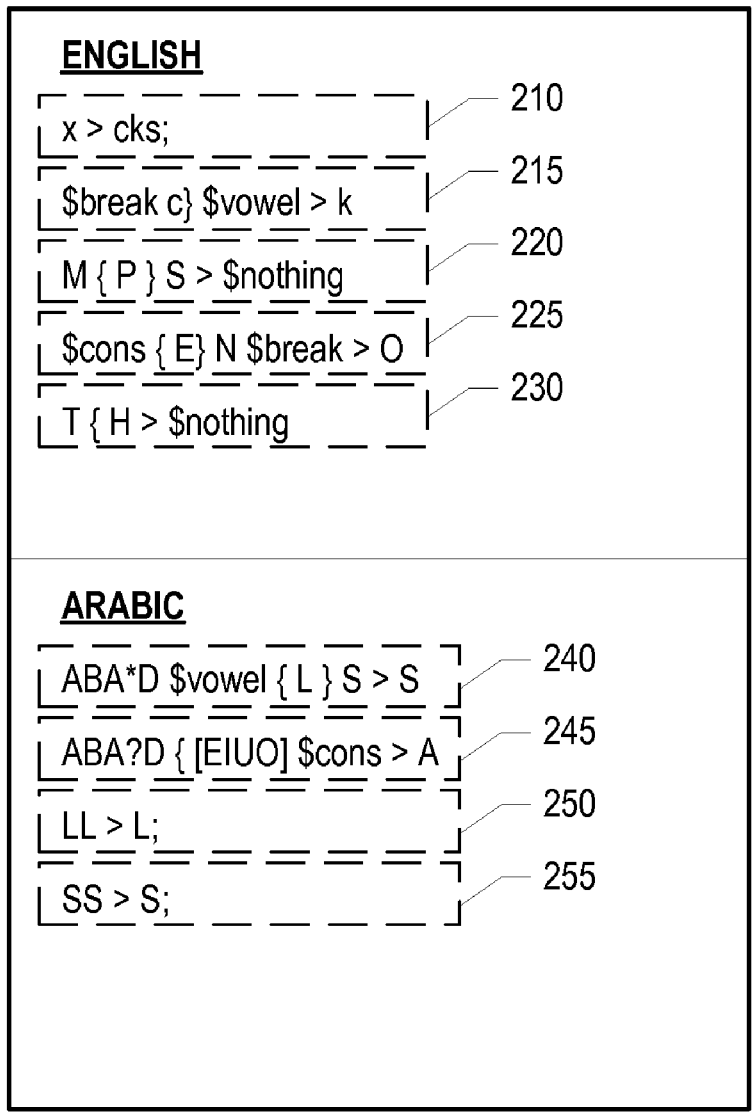
FIG. 2 is a diagram showing culture-specific regularization rules.

FIG. 2 is a diagram showing culture-specific regularization rules. Regularization rules 200 includes to sets of culture-specific regularization rules, which are English rules 210-230 and Arabic rules 240-255.

When a regularization rule engine identifies a name with an "English" cultural classification, whether it is a candidate name or a query name, the regularization rule engine retrieves rules 210-230. Rule 210 instructs the regularization rule engine to convert any "x" into a "cks." Rule 215 instructs the regularization rule engine to convert a "c" at the beginning of a word, and also followed by a vowel, into a "k." Rule 220 instructs the regularization rule engine to delete a "p" when the "p" is between an "m" and an "s." Rule 225 instructs the regularization rule engine to convert an "e," when the e is after a consonant and before an "n" at the end of a word, to an "o." And, rule 230 instructs the regularization rule engine to delete an "h" when the "h" is after a "t."

When a regularization rule engine identifies a name with an "Arabic" cultural classification, whether it is a candidate name or a query name, the regularization rule engine retrieves rules 240-255. Rule 240 instructs the regularization rule engine to convert an "l," when it is part of "abdal," into an "s" when it is before an "s." Rule 245 instructs the regularization rule engine to convert "abdel," "abdil," "abdul," and "abdol" into "abdal." Rule 250 instructs the regularization rule engine to convert an "ll" into an "l." And, rule 255 instructs the regularization rule engine to convert an "ss" into an "s."

As those skilled in the art can appreciate, other culture-specific rules may be used with the invention described herein than what is shown in FIG. 2, such as rules applicable to Afghan, Anglo, Chinese, Farsi, French, German, Hispanic, Indian, Indonesian, Japanese, Korean, Pakistani, Russian, Thai, Vietnamese, or Yoruban cultures.

Figure 3:
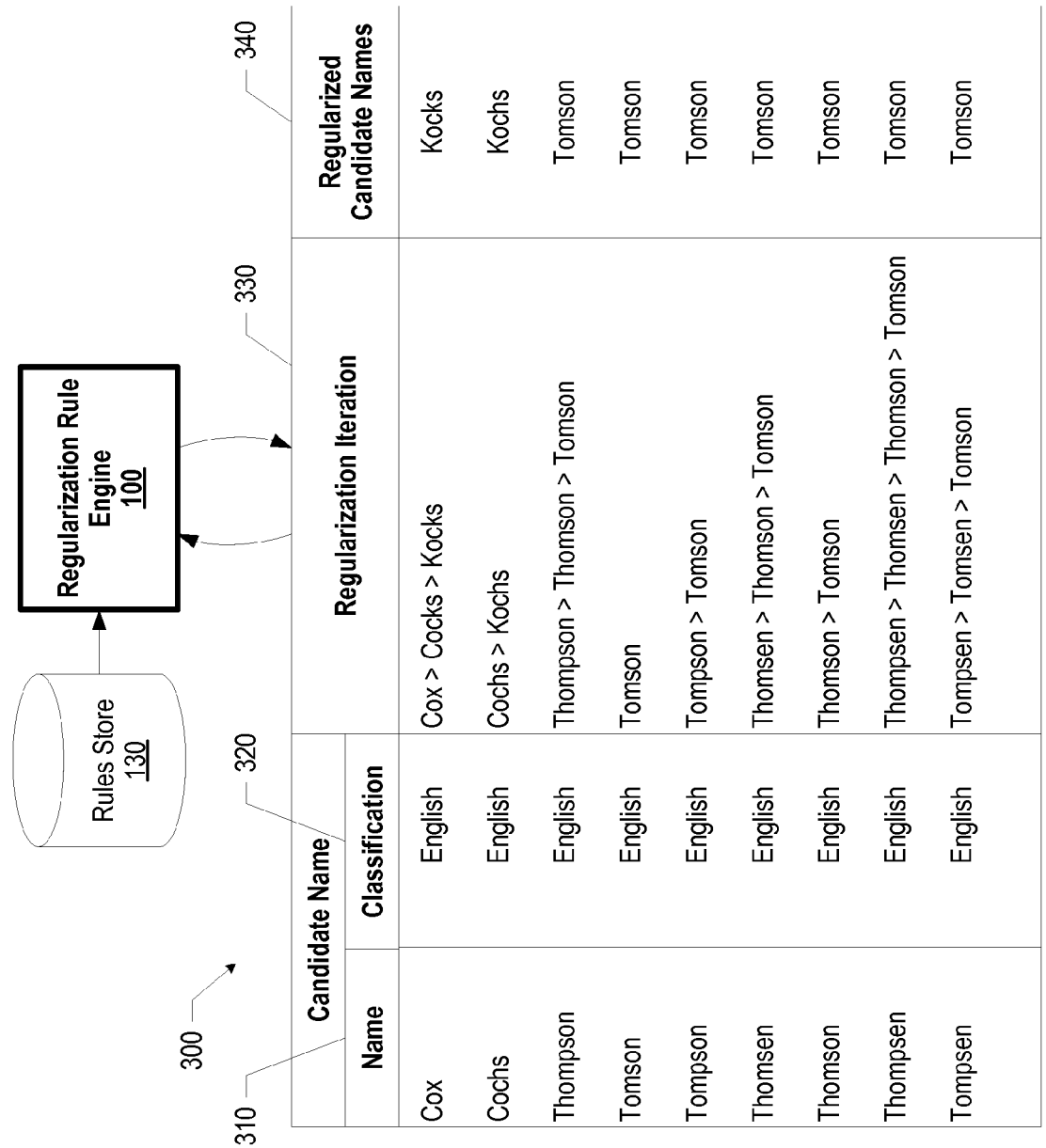
FIG. 3 is a diagram showing a regularization engine iteratively converting candidate names with an English cultural classification to regularized candidate names.

FIG. 3 is a diagram showing a regularization engine iteratively converting candidate names with an English cultural classification to regularized candidate names. Table 300 includes candidate names in column 310 along with their corresponding cultural classification in column 320. Regularization engine 100 retrieves English culture-specific regularization rules from rules store 130 in order to iteratively convert the candidate names included in column 310 to regularized candidate names included in column 340. Regularization rule engine 100 and rules store 130 are the same as that shown in FIG. 1.

Column 330 shows iterative regularized names that result from regularization rule engine 100 applying regularization rules to the various candidate names. Regularization rule engine 100 iteratively applies each applicable regularization rule to the candidate names, which ultimately results in the regularized candidate names included in column 340.

Figure 4:
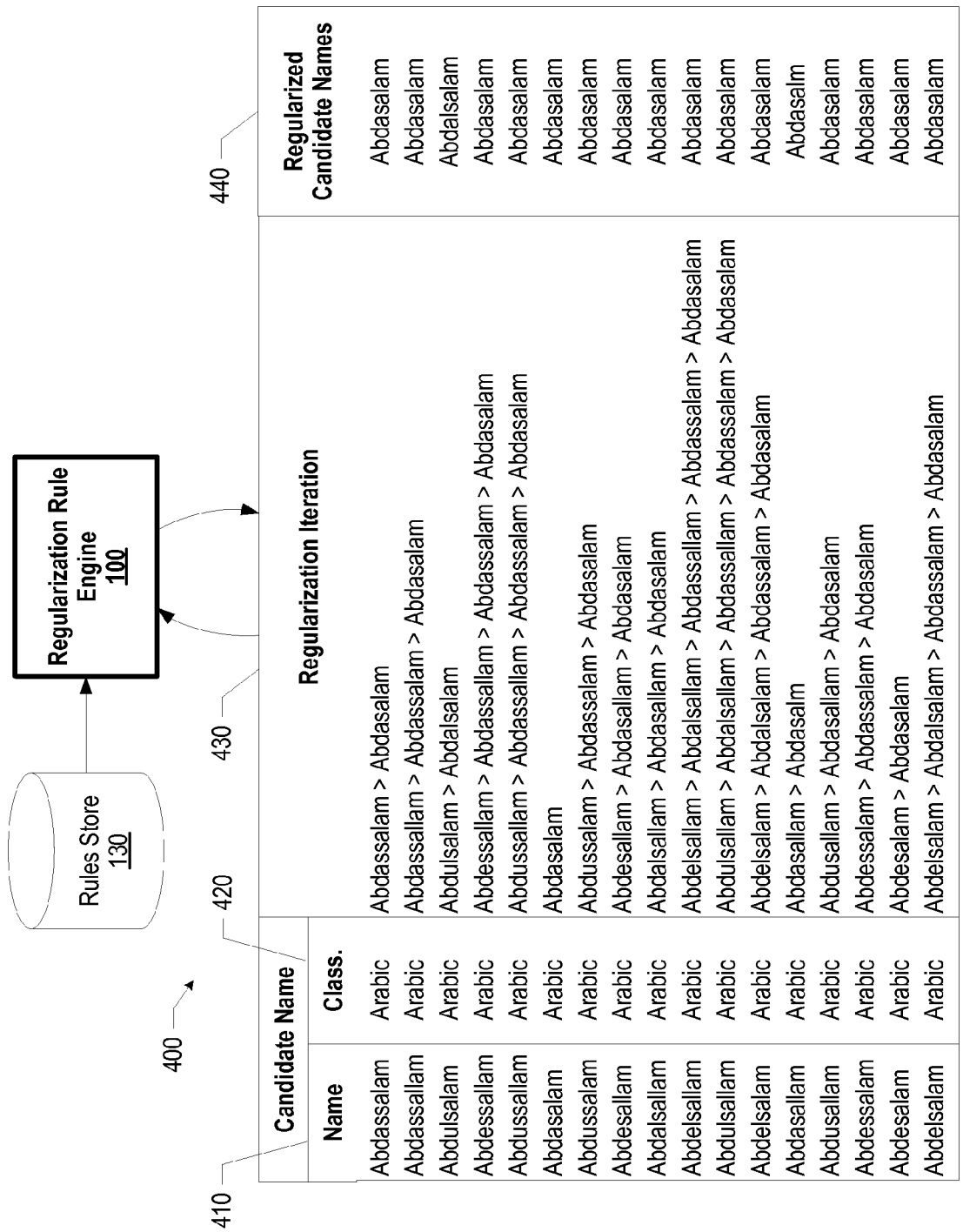
FIG. 4 is a diagram showing a regularization engine iteratively converting candidate names with an Arabic cultural classification to regularized candidate names.

FIG. 4 is a diagram showing a regularization engine iteratively converting candidate names with an Arabic cultural classification to regularized candidate names. FIG. 4 is similar to FIG. 3 with the exception that FIG. 4 includes candidate names that have an "Arabic" cultural classification. Table 400 includes candidate names in column 410 along with their corresponding cultural classification in column 420. Regularization engine 100 retrieves Arabic culture-specific regularization rules from rules store 130 in order to iteratively convert the candidate names included in column 410 to regularized candidate names included in column 440. Regularization rule engine 100 and rules store 130 are the same as that shown in FIG. 1.

Column 430 shows iterative regularized names that result from regularization rule engine 100 applying regularization rules to the various candidate names. Regularization rule engine 100 iteratively applies each applicable regularization rule to the candidate names, which ultimately results in the regularized candidate names included in column 440.

Figure 5:
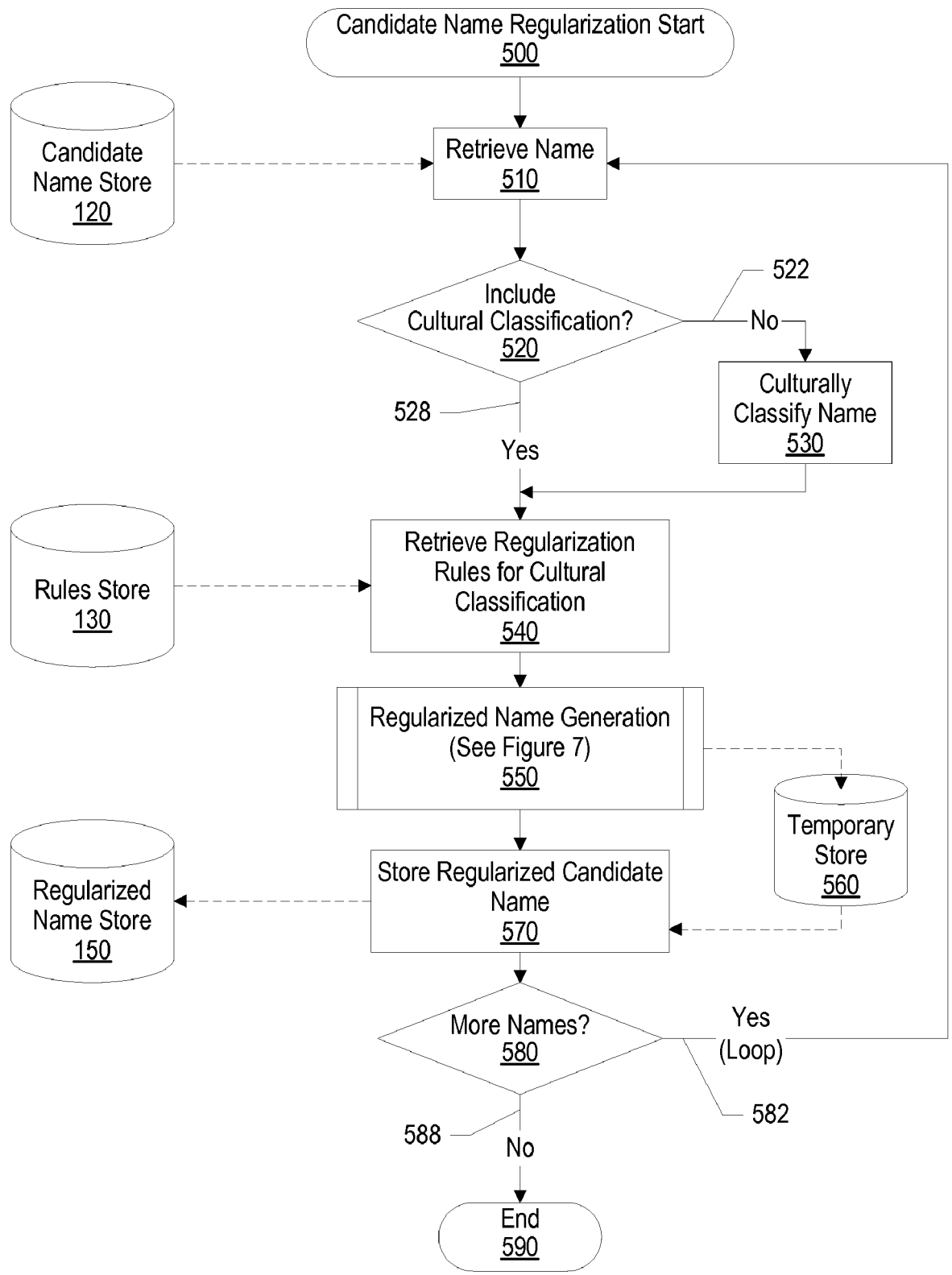
FIG. 5 is a flowchart showing steps taken in converting candidate names to regularized candidate names.

FIG. 5 is a flowchart showing steps taken in converting candidate names to regularized candidate names. The invention described herein iteratively converts a candidate name to a canonical form (regularized name) using one or more regularization rules that are culture-specific to the candidate name.

Processing commences at 500, whereupon processing retrieves a candidate name from candidate name store 120 (step 510). For example, the candidate name may be a name in a financial database. A determination is made as to whether the candidate name includes a cultural classification (decision 520). The cultural classification classifies the candidate name based upon the candidate name's culture origin, such as Afghan, Anglo, Arabic, Chinese, Farsi, French, German, Hispanic, Indian, Indonesian, Japanese, Korean, Pakistani, Russian, Thai, Vietnamese, or Yoruban. Candidate store 120 is the same as that shown in FIG. 1.

If the candidate name does not include a cultural classification, decision 520 branches to "No" branch 522 whereupon processing culturally classifies the candidate name using existing methods known to those skilled in the art (step 530). On the other hand, if the candidate name already includes a cultural classification, decision 520 branches to "Yes" branch 528 bypassing cultural classification steps.

At step 540, processing retrieves regularization rules, which are culture-specific to the candidate name's cultural classification, from rules store 130. For example, the candidate name may be "Cox" and have an "English" cultural classification. In this example, processing retrieves English regularization rules from rules store 130. Rules store 130 is the same as that shown in FIG. 1.

Figure 6:
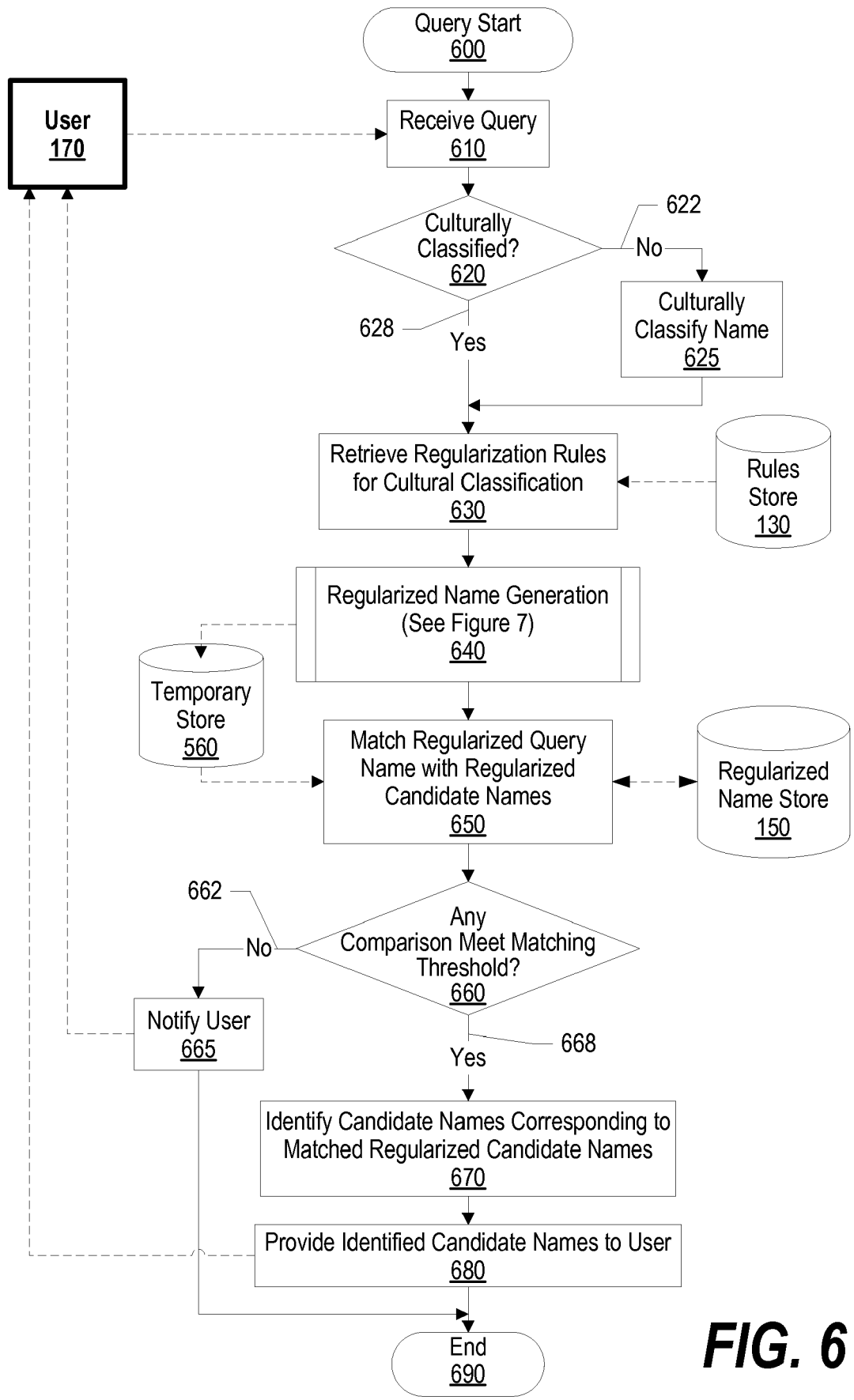
FIG. 6 is a flowchart showing steps taken in converting a query name to a regularized query name, and matching the regularized query name to one or more regularized candidate names.
Figure 7:
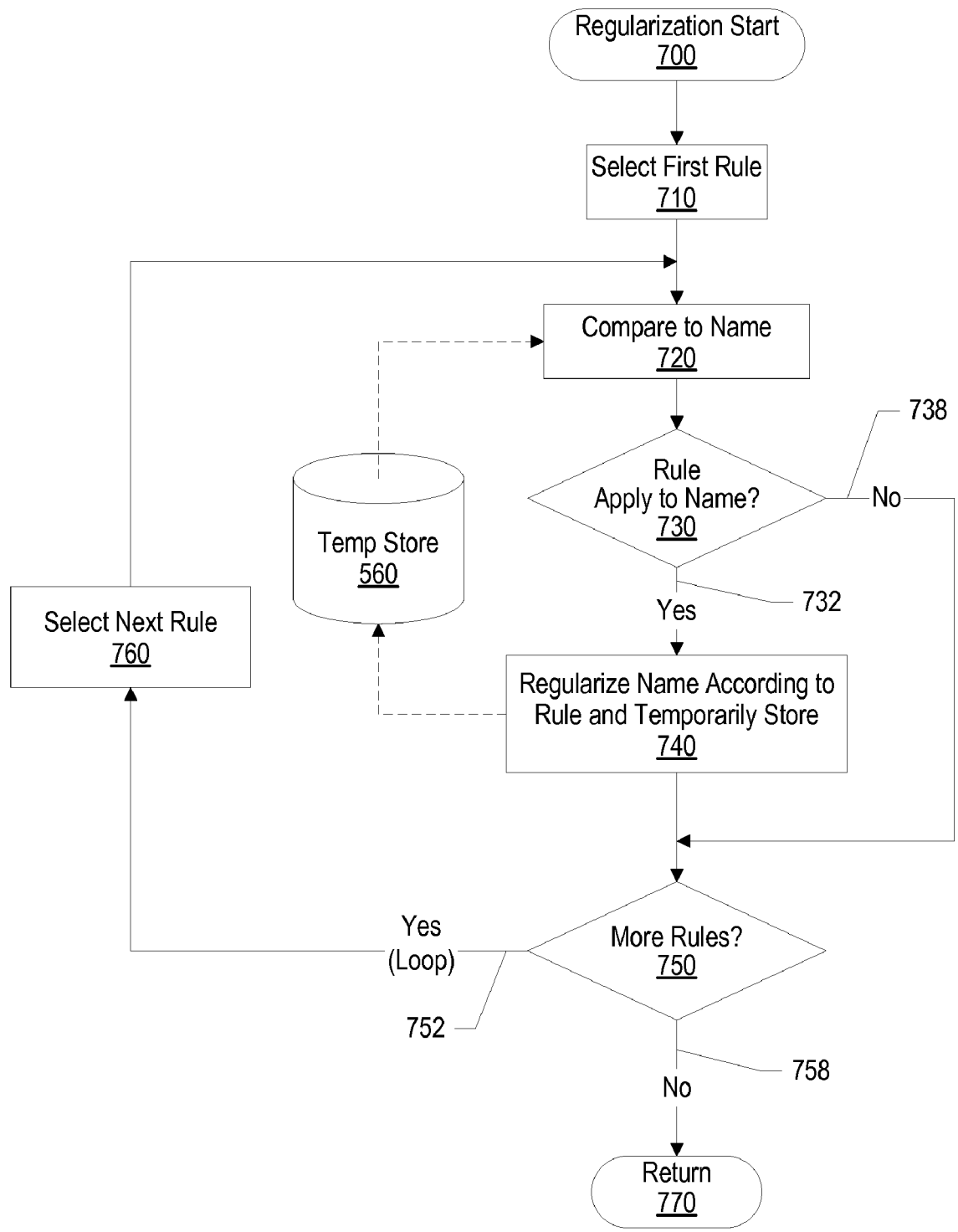
FIG. 7 is a flowchart showing steps taken in iteratively converting a candidate name or a query name to a regularized candidate name or a regularized query name using one or more regularization rules.

Processing proceeds through a series of iterations to apply the culture-specific regularization rules to the candidate name in order to generate a regularized candidate name, which is stored in temporary store 560 (pre-defined process block 550, see FIG. 7 and corresponding text for further details). Temporary store 560 may be stored on a nonvolatile storage area, such as a computer hard drive. At step 570, processing stores the regularized candidate name in regularized name store 150. Processing subsequently compares the regularized names included in regularized name store 150 with regularized query names in order to identify matches to provide to a user (see FIG. 6 and corresponding text for further details).

A determination is made as to whether there are more candidate names to regularize (decision 580). If there are more candidate names to regularize, decision 580 branches to "Yes" branch 582, which loops back to retrieve and process another candidate name. This looping continues until there are no more candidate names to process, at which point decision 580 branches to "No" branch 588 whereupon processing ends at 590.

FIG. 6 is a flowchart showing steps taken in converting a query name to a regularized query name, and matching the regularized query name to one or more regularized candidate names.

Processing commences at 600, whereupon processing receives a query name from user 170 at step 610. For example, user 170 may wish to know whether a particular name is included in a financial database. User 170 is the same as that shown in FIG. 1.

A determination is made as to whether the query name includes a cultural classification (decision 620). If the query name does not include a cultural classification, decision 620 branches to "No" branch 622 whereupon processing culturally classifies the query name using existing methods known to those skilled in the art (step 625). On the other hand, if the query name already includes a cultural classification, decision 620 branches to "Yes" branch 628 bypassing cultural classification steps.

At step 630, processing retrieves regularization rules that are culturally specific to the query name's cultural classification from rules store 130. For example, the candidate name may be "Cox" and have an "English" cultural classification. In this example, processing retrieves English regularization rules from rules store 130. Rules store 130 is the same as that shown in FIG. 1.

Processing proceeds through a series of iterations to apply the culture-specific regularization rules to the query name in order to generate a regularized query name, which is stored in temporary store 560 (pre-defined process block 640, see FIG. 7 and corresponding text for further details). Temporary store 560 is the same as that shown in FIG. 5.

At step 650, processing compares the regularized query name included in temporary store 560 with regularized candidate names included in regularized name store 150 in order to identify potential matches. A determination is made as to whether the comparison results in a match that meets a regularization matching threshold, such as 70% (decision 660).

If one of the regularized candidate names meets the regularization matching threshold, decision 660 branches to "Yes" branch 668 whereupon processing identifies the original candidate names that corresponds to the matched regularized candidate names (step 670). For example, the regularized candidate name be "Kocks," which corresponds to an original candidate name "Cox." Once identified, processing provides the identified original candidate names to user 170 at step 680. On the other hand, if no regularized candidate names meet the regularization matching threshold, decision 660 branches to "No" branch 662 whereupon processing notifies user 170 that no candidate names matched the query name (step 665). Processing ends at 690.

FIG. 7 is a flowchart showing steps taken in iteratively converting a candidate name or a query name to a regularized candidate name or a regularized query name using one or more regularization rules.

Processing commences at 700, whereupon processing selects a first culture-specific regularization rule, such as one of English rules 210-230 shown in FIG. 2 (step 710). At step 720, processing compares the selected rule with the name (candidate name or query name) to identify whether the rule applies to the name. For example, if the select rule is "x>cks," (turn any x into cks) and the name is "Cox," the selected rule applies to the name because the name includes the letter "x."

A determination is made as to whether the selected rule applies to the name (decision 730). If the selected rule applies to the name, decision 730 branches to "Yes" branch 732 whereupon processing regularizes the name according to the selected rule and stores a "first iteration regularized candidate name" in temporary store 560 at step 740. Using the example discussed above, processing converts "Cox" to "Cocks" based upon the selected rule. Since processing may iteratively compare multiple regularization rules to a name, the regularized names temporarily stored are iterations of the final regularized name until the last regularization rule is compared with the name. Temporary store 560 is the same as that shown in FIG. 5.

A determination is made as to whether there are more culture-specific regularization rules to compare with the name (decision 750). If there are more culture-specific regularization rules, decision 750 branches to "Yes" branch 752 whereupon processing loops back and selects the next rule (step 760) and compares it with the regularized name iteration stored in temporary store 560 at step 720.

This looping continues until there are no more culture-specific regularization rules, at which point decision 750 branches to "No" branch 758 whereupon processing returns at 770.

Figure 8:
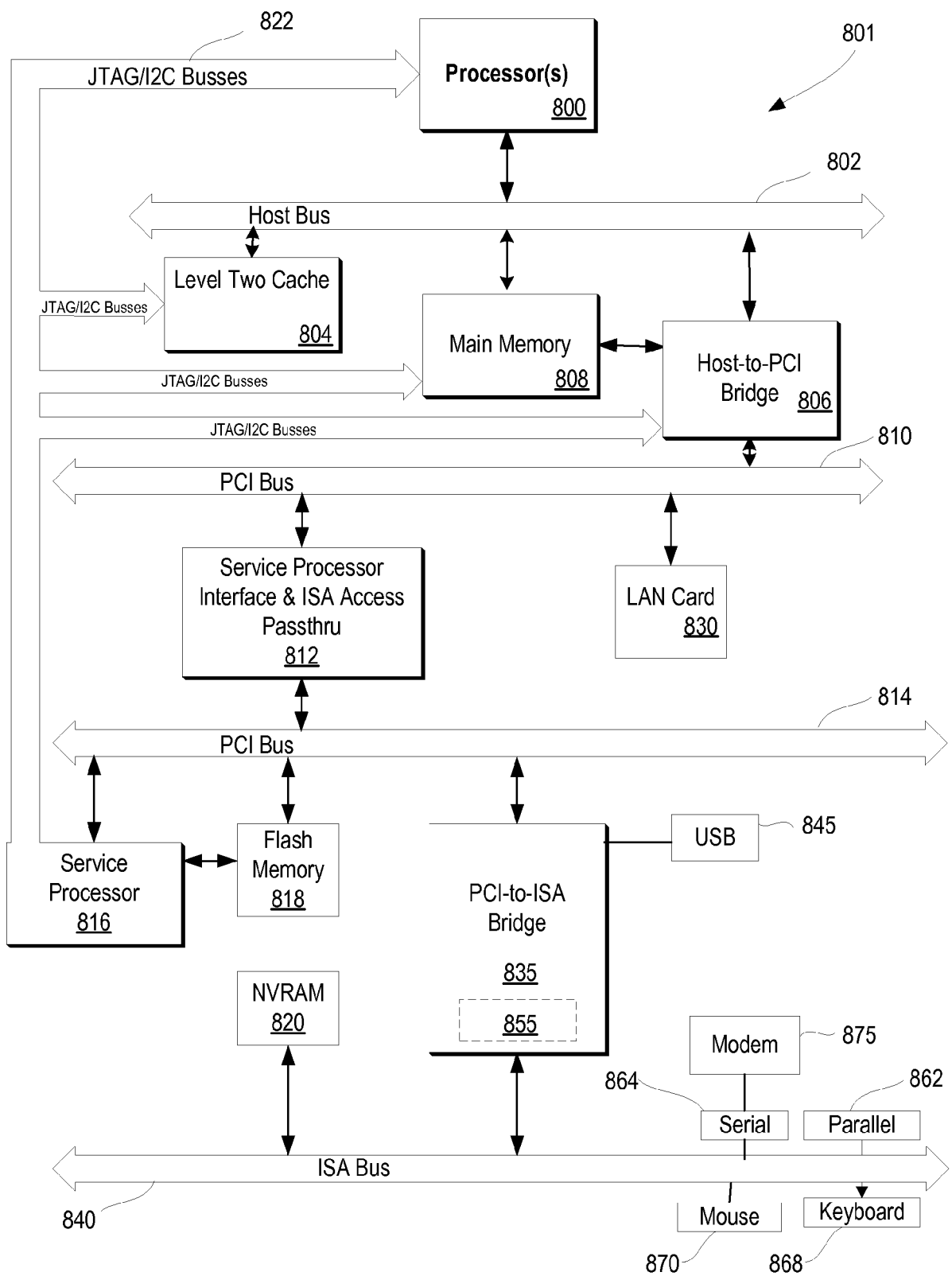
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    retrieving, by a processor, a candidate name from memory;
    identifying, by the processor, a cultural classification that corresponds to the candidate name;
    retrieving, by the processor, one or more culture-specific regularization rules from the memory corresponding to the cultural classification;
    applying, by the processor, one or more of the culture-specific regularization rules to the candidate name, resulting in a regularized candidate name, wherein the applying further comprises:
        determining that a first regularization rule included in the one or more culture-specific regularization rules applies to the candidate name;
        generating a first iteration regularized candidate name by applying the first regularized rule to the candidate name;
        determining that a second regularization rule included in the one or more culture-specific regularization rules applies to the candidate name; and
        generating the regularized candidate name by applying the second regularized rule to the first iteration regularized candidate name;
    storing the regularized candidate name in the memory;
    comparing, by the processor, the regularized candidate name with a regularized query name;
    determining, by the processor, that the comparison meets a regularization matching threshold, which indicates a potential match between the regularized candidate name and the regularized query name; and
    in response to determining that comparison meets the regularization matching threshold, providing the candidate name to the user.

2. The method of claim 1 further comprising:
    receiving a query name from a user;
    detecting that the cultural classification corresponds to the query name;
    applying one or more of the regularization rules to the query name, resulting in the regularized query name; and
    storing the regularized query name in the memory.

3. The method of claim 2 further comprising:
    in response to determining that the comparison meets the regularization matching threshold, determining that the candidate name corresponds to the regularized candidate name; and
    in response to determining that the candidate name corresponds to the regularized candidate name, providing the candidate name to the user.

4. The method of claim 1 wherein each of the culture-specific regularization rules are a context-sensitive rule or a context-free rule, each of the applied culture specific regularization rules used to convert one or more letters included in the candidate name to one or more different letters.

5. The method of claim 1 further comprising:
    wherein the cultural classification corresponds to an originating culture of the candidate name; and
    wherein applying the culture-specific regularization rules does not result in the regularized candidate name corresponding to a different originating culture than the candidate name.

6. The method of claim 1 wherein the cultural classification corresponds to an originating culture that is selected from the group consisting of Afghan, Anglo, Arabic, Chinese, Farsi, French, German, Hispanic, Indian, Indonesian, Japanese, Korean, Pakistani, Russian, Thai, Vietnamese, and Yoruban.

7. A computer program product stored in computer memory, comprising functional descriptive material that, when executed by an information handling system, causes the information handling system to perform actions that include:
    retrieving a candidate name;
    identifying a cultural classification that corresponds to the candidate name;
    retrieving one or more culture-specific regularization rules from corresponding to the cultural classification;
    applying one or more of the culture-specific regularization rules to the candidate name, resulting in a regularized candidate name, wherein the applying further comprises:
        determining that a first regularization rule included in the one or more culture-specific regularization rules applies to the candidate name;
        generating a first iteration regularized candidate name by applying the first regularized rule to the candidate name;
        determining that a second regularization rule included in the one or more culture-specific regularization rules applies to the candidate name; and
        generating the regularized candidate name by applying the second regularized rule to the first iteration regularized candidate name;
    storing the regularized candidate name;
    comparing the regularized candidate name with a regularized query name;
    determining that the comparison meets a regularization matching threshold, which indicates a potential match between the regularized candidate name and the regularized query name; and
    in response to determining that comparison meets the regularization matching threshold, providing the candidate name to the user.

8. The computer program product of claim 7 wherein the information handling system further performs actions that include:
    receiving a query name from a user;
    detecting that the cultural classification corresponds to the query name;
    applying one or more of the regularization rules to the query name, resulting in the regularized query name; and
    storing the regularized query name.

9. The computer program product of claim 8 wherein the information handling system further performs actions that include:
    in response to determining that the comparison meets the regularization matching threshold, determining that the candidate name corresponds to the regularized candidate name; and in response to determining that the candidate name corresponds to the regularized candidate name, providing the candidate name to the user.

10. The computer program product of claim 7 wherein each of the culture-specific regularization rules are a context-sensitive rule or a context-free rule, each of the applied culture specific regularization rules used to convert one or more letters included in the candidate name to one or more different letters.

11. The computer program product of claim 7 wherein the information handling system further performs actions that include:
    wherein the cultural classification corresponds to an originating culture of the candidate name; and
    wherein applying the culture-specific regularization rules does not result in the regularized candidate name corresponding to a different originating culture than the candidate name.

12. The computer program product of claim 7 wherein the cultural classification corresponds to an originating culture that is selected from the group consisting of Afghan, Anglo, Arabic, Chinese, Farsi, French, German, Hispanic, Indian, Indonesian, Japanese, Korean, Pakistani, Russian, Thai, Vietnamese, and Yoruban.

13. An information handling system comprising:
    one or more processors;
    a memory accessible by the processors;
    one or more nonvolatile storage devices accessible by the processors; and
    a set of instructions stored in the memory, wherein one or more of the processors executes the set of instructions in order to perform actions of:
        retrieving a candidate name from one of the nonvolatile storage areas;
        identifying a cultural classification that corresponds to the candidate name;
        retrieving one or more culture-specific regularization rules corresponding to the cultural classification from one of the nonvolatile storage areas;
        applying one or more of the culture-specific regularization rules to the candidate name, resulting in a regularized candidate name, wherein the applying further comprises:
            determining that a first regularization rule included in the one or more culture-specific regularization rules applies to the candidate name;
            generating a first iteration regularized candidate name by applying the first regularized rule to the candidate name;
            determining that a second regularization rule included in the one or more culture-specific regularization rules applies to the candidate name; and
            generating the regularized candidate name by applying the second regularized rule to the first iteration regularized candidate name; and
        storing the regularized candidate name in one of the nonvolatile storage areas;
        comparing, by the processor, the regularized candidate name with a regularized query name;
        determining, by the processor, that the comparison meets a regularization matching threshold, which indicates a potential match between the regularized candidate name and the regularized query name; and
        in response to determining that comparison meets the regularization matching threshold, providing the candidate name to the user.

14. The information handling system of claim 13 further comprises an additional set of instructions in order to perform actions of:
    receiving a query name from a user;
    detecting that the cultural classification corresponds to the query name;
    applying one or more of the regularization rules to the query name, resulting in the regularized query name; and
    storing the regularized query name in one of the nonvolatile storage areas.

15. The information handling system of claim 14 further comprises an additional set of instructions in order to perform actions of:
    in response to determining that the comparison meets the regularization matching threshold, determining that the candidate name corresponds to the regularized candidate name; and
    in response to determining that the candidate name corresponds to the regularized candidate name, providing the candidate name to the user.

16. The information handling system of claim 13 wherein each of the culture-specific regularization rules are a context-sensitive rule or a context-free rule, each of the applied culture specific regularization rules used to convert one or more letters included in the candidate name to one or more different letters.

17. The information handling system of claim 13 wherein the cultural classification corresponds to an originating culture of the candidate name, and
    wherein applying the culture-specific regularization rules does not result in the regularized candidate name corresponding to a different originating culture than the candidate name.

* * * * *